UNITED STATES PATENT OFFICE.

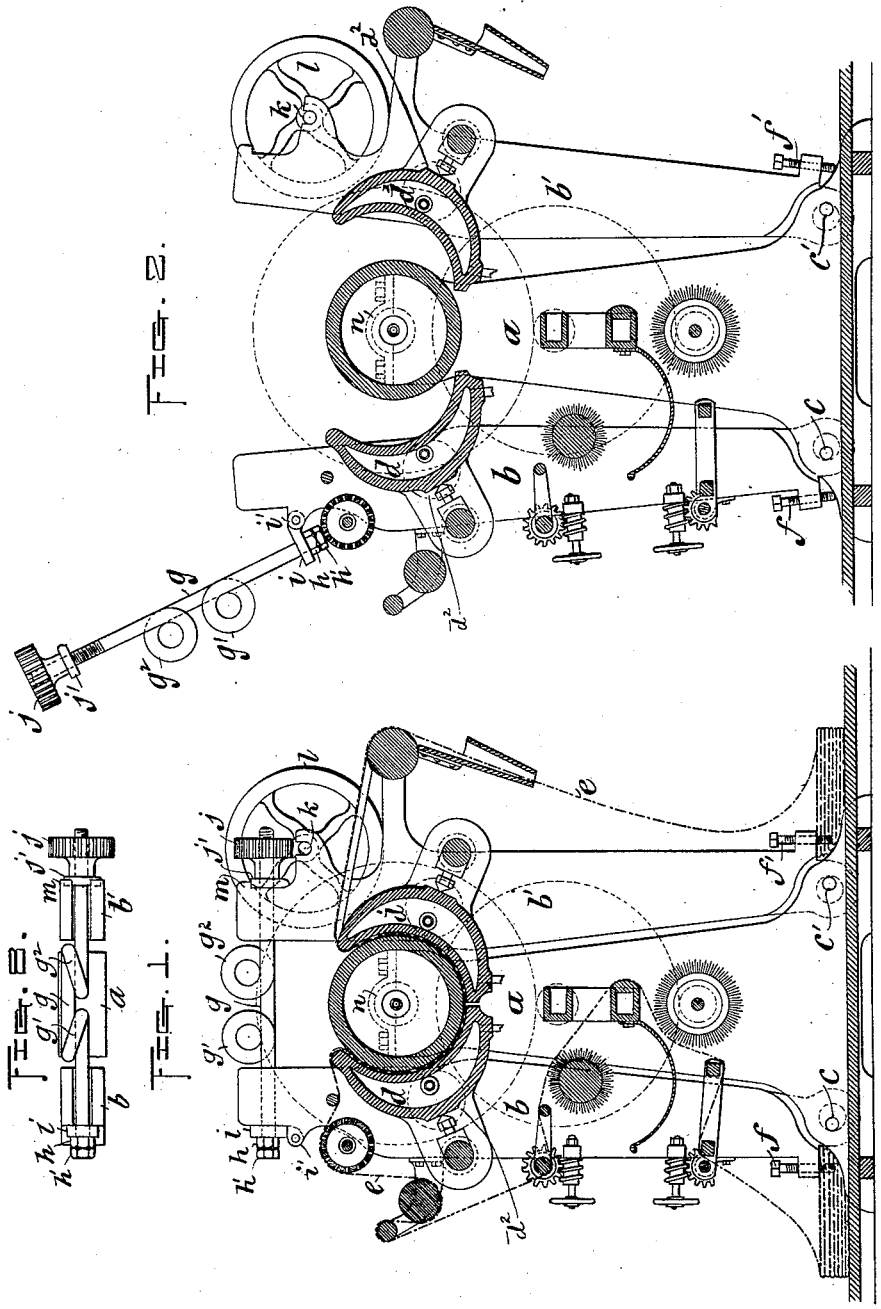

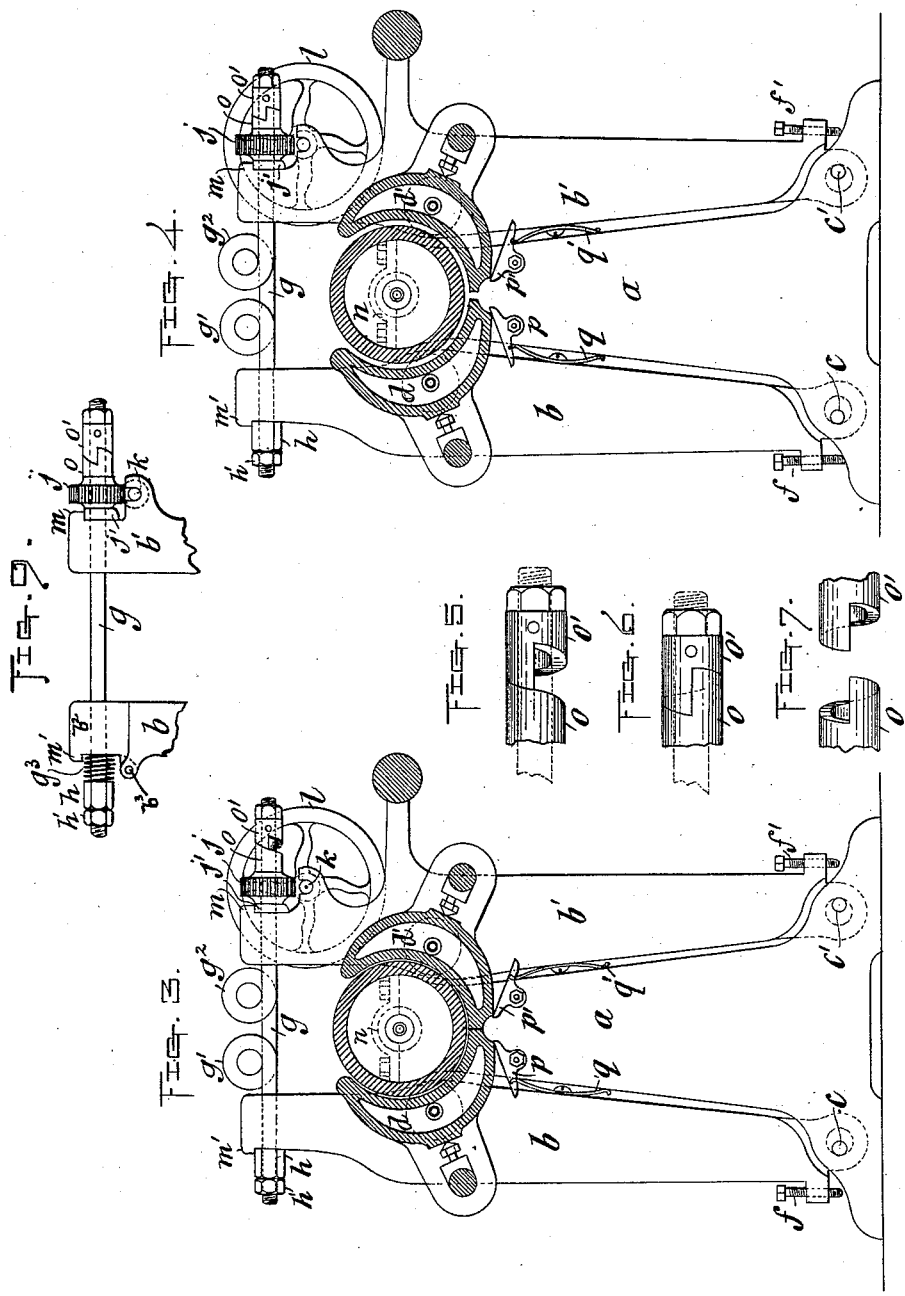

DAVID GESSNER, OF WORCESTER, MASSACHUSETTS.

CLOTH-PRESSING MACHINE.

SPECIFICATION forming part of Letters Patent No. 429,268, dated June 3, 1890.

Application filed January 15, 1890. Serial No. 336,968. (No model.)

*To all whom it may concern:*

Be it known that I, DAVID GESSNER, of Worcester, in the State of Massachusetts, have invented a new and useful Improvement in Cloth-Pressing Machines, of which the following is a specification.

The object of my improvement is, primarily, to so change the construction of certain cloth-pressing machines at present in use as to facilitate the removal of the cylinder therefrom and enable the same to be accomplished without disturbing the relative adjustment at opposite ends of the machines.

In the drawings, Figure 1 is a cross-section of the machine in position for operation. Fig. 2 is a cross-section of the machine in position for the removal of the cylinder. Fig. 3 is a cross-section showing a modified form in position for operation. Fig. 4 shows the same in a modified form with the pressure removed. Figs. 5, 6, and 7 are details of the modification. Fig. 8 is a detail of both forms shown. Fig. 9 is a detail showing a modified arrangement of the spring which may be preferred where the most powerful pressures are desired.

Figs. 1, 2, 3, and 4 show only the frame at one end of the machine, and it will be understood of course that this frame is duplicated at the opposite end of the machine. It will be sufficient, however, to describe the arrangement at one end of the machine as the same is shown.

$a$ is the stationary frame upon which the cylinder is journaled.

$b\ b'$ are two movable frames or uprights, each of which is pivoted at the bottom, as at $c\ c'$, respectively.

$d\ d'$ are the bed-plates, from the end of each of which projects a journal, (shown in dotted lines at $d^2$ in the figures,) which journals are respectively provided with bearings in the uprights $b\ b'$. When the frames or uprights are tilted forward, as shown in Fig. 1, the faces of these bed-plates embrace the cloth $e$, passing between them and the cylinder. When the frames $b$ and $b'$ are tilted backward, as shown in Fig. 2, their backward movement is stayed by the set-screws $f f'$, which act as stops for that purpose. When the frames $b$ and $b'$ are tilted forward, so as to produce pressure upon the cloth, the pressure is intensified by the rod $g$, interposed between the tops of the two frames $b$ and $b'$, said rod being not only a medium of exerting pressure, but also, if coiled into the springs $g'\ g^2$, will give that pressure a yielding character. It is, however, not always essential that the rod should be made in the form of a spring. This rod projects through the top of each of the frames $b$ and $b'$, and upon one end outside of the frame is provided with the nut $h$ and the check-nut $h'$. The nut $h$ enables a relative adjustment to be made on the rods at the two ends of the machine, so as to bring the surfaces of the bed-plates parallel with the surface of the cylinder and produce the same pressure upon one end of the cylinder as upon the other. These nuts, being once adjusted, do not require to be changed even when the parts are disconnected, as hereinafter described, for the purpose of removing the cylinder.

$i$ is a collar surrounding the rod $g$, which collar is pivoted to the frame $b$ at $i'$. This collar is between the nut $h$ and the surface of the frame $b$. Adjoining the collar $i$ the rod $g$ rests in a slot extending downward from the top of the frame $b$, (see Fig. 8,) and enabling the rod $g$ to be lifted upward from the position shown in Fig. 1 to the position shown in Fig. 2, where it is swung back on the pivot $i'$ as a hinge. The rod $g$ near its opposite end rests in a similar slot in the top of the frame $b'$, so that it may be freely lifted upward and swung back from the position shown in Fig. 1 to the position shown in Fig. 2. The extremity of the rod projecting beyond the frame $b'$ is in the modification shown in Figs. 1 and 2 screw-threaded, and upon this screw-thread is mounted a worm-gear $j$, which is actuated by the worm-shaft $k$, upon which worm-shaft is mounted a hand-wheel $l$.

When the machine is in condition for pressing, the collar $j'$, connected with the worm-gear $j$, rests against the face of the frame $b'$ under the overhanging lip $m$, which acts to prevent the rod from accidentally escaping from the slot in the top of the frame $b'$. In this position the pressure upon the two frames $b$ and $b'$ is exerted between the collars $i$ and $j'$, and is caused by the tightening of the worm-gear $j$ upon the screw-thread.

When it is desired to release the pressure, the turning backward of the worm-gear $j$ will accomplish it, and then if it is desired to remove the rod $g$ from the position in which it obstructs the removal of the cylinder the worm-gear $j$ is screwed backward far enough to permit the operator to disengage the collar $j'$ from the lip $m$ and swing the rod $g$ upward and backward into the position shown in Fig. 2. At the same time the frames $b$ and $b'$ are tilted backward until they rest on the set-screws $f$ and $f'$, and in this position nothing is required for the removal of the cylinder excepting the removal of the journal-cap $n$ and the corresponding cap at the opposite end of the machine.

In the modification shown in Figs. 3 and 4 the pivoted collar $i$ is omitted, so that the rod $g$ will be lifted bodily out of the slots in the tops of the frames $b$ and $b'$. In lieu of having the worm-gear $j$ screw-threaded on the rod $g$ it is mounted loosely upon the same. The inverse cams $o$ $o'$ are fixed, respectively, to the worm-gear $j$ and the rod $g$, so that when the worm-gear $j$ is turned forward it will move the cams from the relative position shown in Figs. 4 and 6 to the relative position shown in Figs. 3 and 5. The surfaces of these cams are given such a pitch that a half-revolution of the worm-gear will produce sufficient tightening of the rod $g$ for the production of the maximum pressure upon the cylinder, and when the cams are in the position shown in Figs. 4 and 6 the collar $j'$ may be disengaged by the operator from the lip $j$, and the nut $h$ can be disengaged from the lip $m'$, enabling the rod $g$ to be lifted bodily out of the slots in the frames $b$ and $b'$, so as to no longer obstruct the removal of the cylinder.

In the modification shown in Fig. 9 the spring, instead of being between the frames $b$ and $b'$, is located at $g^3$ outside of one of the uprights and between it and the nut $h$.

In Figs. 3 and 4 is shown an arrangement for maintaining the position of the bed-plates as the frames $b$ and $b'$ are tilted backward. This consists of the slides $p$ and $p'$, upon the upper surfaces of which the lower edges of the bed-plates respectively rest. The upper surfaces of these slides are arranged substantially parallel to the path in which the centers of the bed-plates move as the frames $b$ and $b'$ are tilted backward, so that the lower edges of the bed-plates will slide backward upon these slides, and they will serve as rests for the bed-plates in whatever position they may be held by the frames $b$ and $b'$.

Between the main frame $a$ and the frame $b$ is interposed a spring $q$, and likewise between the frame $a$ and the frame $b'$ is interposed a spring $q'$. The object of these springs is to produce a backward pressure on each of the frames $b$ and $b'$, so as to cause them to follow up the release of the pressure by the worm-gear $j$ to such a distance as to actually release the cloth from pressure, as is shown in Fig. 4.

In Fig. 9 at the top of the upright $b$ a modified construction is shown in the following respects: Instead of having the rod $g$ rest in a slot on the top of the frame of the upright $b$, as shown in Fig. 8, it is passed through a hole bored near the top of the upright, and that portion $b^2$ of the top of the upright containing the hole is made separate from and hinged to the lower portion $b$ of the upright by the hinge $b^3$, so that upon detaching the rod $g$ from the upright $b'$ it, together with the piece $b^2$, may be swung upward on the hinge $b^3$.

I have shown vertical slots in the uprights to receive the rods; but I do not desire to limit myself to this direction of the slots, nor do I desire to limit myself in any other manner to the particular forms of mechanism shown.

I claim—

1. In combination, the cylinder, the bed-plates, two pairs of uprights respectively carrying the opposite ends of the bed-plates, rods crossing from one upright to the other above the cylinder, a worm-shaft, actuating worm-gears on both rods, whereby the pressure is applied and released, an independent means of adjustment for each rod, and means of connection between the rods and their respective pairs of uprights, permitting of disconnection and reconnection without disturbing the relative adjustment of the two rods, substantially as described.

2. In combination, the cylinder, the bed-plates, two pairs of uprights respectively carrying the opposite ends of the bed-plates, rods crossing from one upright to the other of each pair, and means of connection between the rods and the respective pairs of uprights, permitting of lateral disconnection, substantially as described.

3. In combination, the cylinder, the bed-plates, the uprights supporting the bed-plates, the rods connecting the uprights on one side of the cylinder with those on the other, and the cams whereby the rods are caused to draw the uprights toward one another, substantially as described.

4. In combination, the cylinder, the bed-plates, the uprights supporting the bed-plates, and the rods connecting the uprights on one side of the cylinder with those on the other, said uprights being provided with open slots to receive the rods, substantially as described.

5. In combination, the cylinder, the bed-plates, the uprights supporting the bed-plates, and the rods connecting the uprights on one side of the cylinder with those on the other, said rods lying in slots at one end and being hinged at the opposite end, substantially as described.

6. In combination, the cylinder, the bed-plates, the uprights supporting the bed-plates, the journals by which the bed-plates are mounted on the uprights, and the slides upon which the bed-plates rest as they are moved back from the cylinder, substantially as described.

7. In combination, the cylinder, the frame supporting the same, the bed-plates, the uprights supporting the bed-plates, and springs interposed between the frame and the uprights, which tend to relieve the pressure of the bed-plates, substantially as described.

DAVID GESSNER.

Witnesses:
J. E. GREER,
FRED KEMPER.